ium Office 3,382,231
Patented May 7, 1968

3,382,231
METHOD OF EXTRACTING NUCLEOTIDES, NUCLEOSIDES AND THEIR BASE COMPONENTS FROM AQUEOUS SOLUTIONS
Tsuneo Hirahara, Tokyo, and Takeshi Tsukada, Yoshihisa Suzuki, and Tadashi Nakamura, Kanagawa-ken, Japan, assignors to Ajinomoto Co., Inc., Tokyo, Japan
No Drawing. Continuation-in-part of application Ser. No. 512,541, Dec. 8, 1965. This application Feb. 18, 1966, Ser. No. 528,405
Claims priority, application Japan, Dec. 9, 1964, 39/69,316; Mar. 6, 1965, 40/13,010; July 13, 1965, 40/42,164
10 Claims. (Cl. 260—211.5)

ABSTRACT OF THE DISCLOSURE

All naturally occurring purine ribonucleosides, purine ribonucleotides, the desoxyribose analogs thereof, derivatives and other analogs thereof not occurring in nature, and all purine and pyrimidine bases can be extracted from their aqueous solutions by a separate organic phase consisting of tertiary phosphates of alkanols having 2 to 5 carbon atoms or solutions of such phosphates in organic solvents insoluble in the aqueous phase, and can thus be separated from accompanying materials insoluble in the organic phase. The extraction yield is affected by the pH of the aqueous system.

This is a continuation-in-part of our application No. 512,541, filed Dec. 8, 1965, and now abandoned.

This invention relates to the extraction of purine nucleotides, nucleosides and their base components from aqueous solutions.

All known natural nucleotides and nucleosides are, respectively, ribotides and ribosides or desoxyribotides and desoxyribosides of organic bases which are either purines or pyrimidines. They are all useful intermediates for pharmaceutical preparations and for food supplements. They are obtained in the form of their aqueous solutions by hydrolysis of nucleoproteins and substances containing the same, and can be recovered from such solutions by adsorption on ion-exchange resins and elution from the resins. While the ion exchange method has many advantages over other known methods of recovery, it is applicable to operations on an industrial scale only at relatively high cost.

We have now found that all purine nucleotides and natural nucleosides available to us as well as the purine and pyrimidine base components thereof are more soluble in tertiary phosphates of the lower alkanols than in aqueous solutions. They can, therefore, be extracted from their aqueous solutions when the solutions are contacted with a liquid medium at least partly consisting of such phosphates. For effective extraction, the aqueous solution of the nucleotides should have a pH value of less than 5. Substances which are purine nucleotides or nucleosides, but are not found in nature, are also capable of being extracted from their aqueous solutions by means of the afore-mentioned phosphates, hereinafter designated as trialkyl phosphates for the sake of brevity.

Nucleosides which have been recovered successfully from their aqueous solutions by extractions with trialkyl phosphates include inosine, guanosine, adenosine, cytidine, uridine, thymidine, xanthosine, orotidine, AICAR (5-amino-4-imidazole-carboxamide riboside) and S–AICAR (5-amino-4-imidazole N-succino carboxamide riboside), and the desoxyribose analogs of these nucleosides, as well as their 2′,3′-O-alkylidine derivatives.

The bases which have been extracted successfully from their aqueous solutions include adenine, xanthine, hypoxanthine, methylxanthine, uracil, methyluracil, thymine, cytosine, methylcytosine, isocytosine, and guanine. We are not aware of a purine or pyrimidine base which could not be extracted from its aqueous solution by means of trialkyl phosphates.

Nucleotides include 5′-inosinic acid (IMP), 5′-guanylic acid (GMP), 5′-adenylic acid (AMP), 5′-xanthylic acid (XMP) and the desoxyribose analogs of these purine nucleotides, as well as their 2′,3′-O-alkylidene derivatives.

Typical aqueous solutions to which the method of the invention is applied to advantage include hydrolyzates of nucleic acids, regardless of the method employed for bringing about hydrolysis; fermentation broths obtained by cultivating microorganisms which produce purine nucleotides, nucleosides or bases from a nutrient medium, and the cell-free filtrates obtained from such broths; aqueous extracts of animal vegetable tissues; and reaction mixtures obtained by chemical synthesis.

Trialkyl phosphates whose alkyl groups have two to five carbon atoms may be employed in the method of the invention. Triethyl phosphate and tributyl phosphate are most readily available at advantageous cost at this time.

The amount of trialkyl phosphate contacted with the aqueous solution is readily selected to suit specific conditions. The nature of the aqueous solution, the concentration of the material to be extracted, and similar factors have to be taken into consideration. Generally, the volume of the trialkyl phosphate is between ½ and 4 times the volume of the aqueous solution.

The organic phase which is contacted with the aqueous solution may consist exclusively of one or several trialkyl phosphates but it is often advisable to dilute the phosphate with organic solvents which are substantially insoluble in water, such as butanol or butyl acetate, in which the substances to be extracted are soluble. The presence of the inert, water-insoluble solvent reduces the loss of trialkyl phosphate by dissolution in the aqueous phase. Such loss can be further reduced or practically eliminated by saturating or almost saturating the aqueous phase with neutral salts, such as sodium chloride, sodium sulfate, ammonium chloride and the like. Salting out of the trialkyl phosphate from the aqueous phase does not significantly affect the extraction.

The percentage of the extracted substance varies somewhat with the pH of the aqueous phase, and has a distinct maximum at or near the neutral point in the case of nucleosides or bases, and at or near a pH of 1 in the case of purine nucleotides. Extraction ratios of about 90% however, can be obtained over a pH range from about 3 to 12 for nucleosides and bases, and at a pH value of less than 5 for purine nucleotides, by proper selection of temperature, the addition of neutral salts to the aqueous solution and repeated extraction, if necessary.

The extraction procedure can be carried out at all temperatures at which the two phases are liquid. In the absence of specific advantages of higher temperatures, extraction is preferably carried out at the prevailing ambient temperature. Small amounts of trialkyl phosphate are lost when strongly alkaline or strongly acid aqueous solutions are contacted with trialkyl phosphate at elevated temperature, and this fact also favors operation at or below room temperature.

All conventional liquid-liquid extraction procedures and devices may be employed in the method of the invention. The contents of vessels containing the aqueous solution and the organic extraction medium may be subjected to vigorous agitation, and conventional continuous extraction processes in which the two liquids flow countercurrently in contact with each other may be employed. Good results have also been achieved by injecting one liquid into the other and by thereby dispersing the injected liquid.

The following Examples I to IV show the typical effects of certain process variables on the results obtained by the method of this invention.

Example I 2-mercapto-2',3'-O-isopropylidene inosine was oxidized by means of hydrogen peroxide, and the intermediate product obtained was heated in an aqueous ammonia solution. The reaction mixture was partly evaporated in a vacuum, whereby the ammonia was removed. After the concentrate had stood at ambient temperature for about three hours, 2',3'-O-isopropylidene guanosine crystallized. The crystals were recovered by filtration, and the filtrate was used for the following tests.

The filtrate had a pH of 8.02 and was divided into three batches. Two batches were adjusted to pH 4.01 and 10.02 respectively with 1-N sulfuric acid and 1-N ammonium hydroxide solution. Two pairs of 5-ml. samples were taken from each of the three batches, and 1.2 g. sodium chloride were added to one sample of each pair. Each sample was then stirred with 5 ml. tributyl phosphate for one hour at 14° C. or for 30 minutes at 34° C.

The mixtures were permitted to stand until they separated into two layers, and the amount of 2,3'-O-isopropylidene guanosine in the organic top layer and the aqueous bottom layer of each sample was determined by ultraviolet absorption.

The effects of temperature, pH, and addition of NaCl on the distribution of the nucleoside between the aqueous and the organic phase, and on the water content of the latter are evident from the following table.

| Temp., °C. | pH | NaCl | Nucleoside, percent, in— | | Water percent, in top layer | Distribution ratio of nucleoside |
|---|---|---|---|---|---|---|
| | | | Top 1 | Bottom 1 | | |
| 14 | 4.01 | − | 0.171 | 0.096 | 0.66 | 1.8 |
| | | + | 0.291 | 0.045 | 4.41 | 6.5 |
| | 8.02 | − | 0.146 | 0.155 | 6.78 | 0.91 |
| | | + | 0.144 | 0.140 | 4.48 | 1.04 |
| | 10.03 | − | 0.080 | 0.219 | 6.61 | 0.82 |
| | | + | 0.087 | 0.133 | 4.38 | 0.66 |
| 34 | 4.01 | − | 0.186 | 0.136 | 6.54 | 1.4 |
| | | + | 0.192 | 0.045 | 4.23 | 4.3 |
| | 8.02 | − | 0.126 | 0.219 | 6.63 | 0.57 |
| | | + | 0.144 | 0.144 | 4.42 | 1.00 |
| | 10.03 | − | 0.061 | 0.220 | 6.47 | 0.28 |
| | | + | 0.073 | 0.156 | 4.42 | 0.47 |

Example II

Sample solutions of 2',3'-O-isopropylidene guanosine adjusted to pH 4.01, 8.02, and 10.03 were prepared as described in Example I, and were each mixed with 1.2 g. sodium chloride. 5 ml. triethyl phosphate were added to each sample, and the heterogeneous mixtures were stirred vigorously at 15° C. for one hour or at 30° C. for 40 minutes. The distribution of the nucleoside between the two layers in each sample was determined as in Example I. The several sets of conditions and the results obtained are listed below.

| Temp., °C. | pH | Nucleoside, percent, in— | | Water, percent, in top layer | Distribution ratio of nucleoside |
|---|---|---|---|---|---|
| | | Top 1 | Bottom 1 | | |
| 15 | 4.01 | 0.149 | 0.0099 | 18.4 | 15.1 |
| | 8.02 | 0.153 | 0.029 | 17.9 | 5.3 |
| | 10.03 | 0.129 | 0.025 | 17.5 | 5.2 |
| 30 | 4.01 | 0.145 | 0.013 | 15.0 | 11.1 |
| | 8.02 | 0.152 | 0.041 | 15.0 | 3.7 |
| | 10.03 | 0.155 | 0.040 | 15.0 | 3.9 |

The solutions of 2',3'-O-isopropylidene guanosine in trialkyl phosphate are readily separated from the aqueous liquids. They may be dried in a conventional manner and employed directly as starting materials for the reaction of the nucleoside with phosphorus oxychloride to the corresponding nucleotide. The nucleosides may also be transferred to another aqueous medium by admixing hydrocarbons or halogenated hydrocarbons to the trialkyl phosphate and contacting the mixture with an aqueous phase.

Example III

Aqueous solutions containing GMP, 2',3'-O-isopropylidene GMP (Ip–GMP), guanosine (GR), and 2',3'-O-isopropylidene GR (Ip–GR) at concentrations of 10 grams per liter, 14 grams per liter, 3 grams per liter, and 3 grams per liter, respectively, were prepared and adjusted to pH 1, 3, 4, 5, 6, 7, 9 and 11.

100 ml. triethyl phosphate and 10 g. sodium chloride were added to 100 ml. of each solution, and the mixtures were stirred at 20° C. for 30 minutes. They were then permitted to separate into two layers which were separated from each other. The amounts of GMP, Ip–GMP, GR and Ip–GR in each solution were determined by ultra violet absorption. The extraction ratio (percentage extracted) at the various pH values is shown in the following table.

| Temp. (°C.) | pH | Extraction ratio (percentage extracted) | | | |
|---|---|---|---|---|---|
| | | Ip–GMP | GMP | Ip–GR | GR |
| 20 | 1 | 85 | 39 | 9 | 5 |
| | 3 | 57 | 25 | 15 | 8 |
| | 4 | 45 | | | |
| | 5 | 28 | 13 | 55 | 40 |
| | 6 | 15 | | | |
| | 7 | 5 | 0.5 | | 66 |
| | 9 | 2 | 0.7 | | 69 |
| | 11 | | | | 58 |

Example IV

Aqueous solutions containing 5-amino-4-imidazole carboxamide riboside (AICAR) and S–AICAR at concentrations of 20 grams per liter and 5 g. per liter, respectively, were prepared and adjusted to pH 1, 2, 4, 8 and 10.

100 ml. triethyl phosphate and 10 g. sodium chloride were added to 100 ml. samples of each solution, and the mixtures were stirred at room temperature for 30 minutes.

They were then permitted to separate into two layers which were separated from each other. The amounts of AICAR, and S–AICAR in each solution were determined by ultra violet absorption.

The extraction ratio (percentage extracted) at the various pH values is shown in the following table.

| pH | Extraction ratio (percentage extracted) | |
|---|---|---|
| | AICAR | S–AICAR |
| 1 | 64 | 75 |
| 2 | | 85 |
| 4 | 76 | |
| 8 | 84 | 9 |
| 10 | 78 | |

The above solutions of purine nucleotides or the nucleoside derivatives in trialkyl phosphate are readily separated from the aqueous liquids. They may be dried in a conventional manner and employed directly as starting materials for subsequent reactions. The extracted substances may also be transferred to another aqueous medium by admixing hydrocarbons or halogenated hydrocarbons to the trialkyl phosphate and contacting the mixture with an aqueous phase.

Suitable solvents which discharge the extracted substances from the trialkyl phosphate phase include benzene, toluene, dichloromethane, dichloroethane, carbon tetrachloride and other hydrocarbons and halogenated hydrocarbons, but it is very difficult to achieve the same result with solvents which are not hydrocarbons or halogenated hydrocarbons. The aqueous phase which accepts the substance discharge from the trialkyl phosphate solution may be water, an aqueous solution of an inorganic salt, the acid addition salt of an organic amine, aqueous ammonia, dilute alkali, and the like. The extracted substance may be recovered readily by conventional methods from the second aqueous solution which is free of contaminants that would have interfered with similar treatment of the original aqueous solution. Recovery of the extracted substance in yields as high as 95% is readily possible.

The method lends itself also to the separation of nucleosides from nucleotides. The former are readily extracted from their aqueous solutions by trialkyl phosphates at or near the neutral point, but nucleotides are retained in the aqueous phase under the same conditions. On the other hand, the nucleotides are readily extracted at or near a pH of 1, where the nucleosides remain in the aqueous phase.

The following examples are further illustrative of this invention.

Example V

Aqueous solutions containing guanosine at a concentration of about 3 grams per liter were adjusted to pH 7, 8, 9, and 10 respectively. 20 ml. triethyl phosphate and 2 g. sodium chloride were added to each solution, and the mixtures were stirred at room temperature for 20 minutes. They were then permitted to separate into two layers which were separated from each other. The amount of guanosine in each solution was determined by ultraviolet absorption at 260 millimicrons. The extraction ratio (percentage extracted) at the various pH values was as follows:

| pH: | Guanosine percent |
|---|---|
| 7 | 66 |
| 8 | 73 |
| 9 | 69 |
| 10 | 58 |

Example VI

Samples of dilute solutions of inosine, hypoxanthine, AICAR, and 4-amino-5-imidazolecarboxamide, 2′, 3′-O-isopropylidene riboside (Ip–AICAR) were adjusted to pH 4, 8, and 10. Samples of each solution were extracted with equal volumes of triethyl phosphate or tributyl phosphate at room temperature for 60 minutes with agitation. The solution extracted with triethyl phosphate was mixed with sodium chloride in an amount of 2 g. per 20 ml. of the original aqueous solution, and the two phases in each mixture were permitted to separate. They were then analyzed for distribution of the solute in the two layers. The results are listed below.

| Solvent | pH | Percentage extracted ||||
|---|---|---|---|---|---|
| | | Inosine | Hypoxanthine | AICAR | Ip-AICAR |
| Triethyl phosphate | 4 | 61 | 77 | 76 | 95 |
| | 8 | 60 | 80 | 84 | 93 |
| | 10 | 19 | 71 | 78 | 93 |
| Tributyl phosphate | 4 | 8.8 | 28 | 14 | 84 |
| | 8 | 7.3 | 24 | 11 | 85 |
| | 10 | 0.5 | 9.0 | 7.5 | 86 |

Example VII

*Bacillus subtilis* ATCC 15115 capable of synthesizing AICAR was cultivated on a nutrient medium until the concentration of AICAR in the broth reached 0.60 g. per dl. The broth was then adjusted to pH 8 with sodium hydroxide solution.

50 ml. of the broth were mixed with 5 g. sodium chloride and 50 ml. tributyl phosphate, and the mixture was stirred vigorously at room temperature for 20 minutes. After the two layers had been permitted to separate, a concentration of 0.39 g./dl. AICAR was found in the organic tributyl phosphate phase.

Example VIII

A tributyl phosphate solution containing 1.08 g. AICAR per 100 ml. was prepared by the method of Example VII, and was vigorously stirred with 100 ml. 0.5 N aqueous ammonium hydroxide and 100 ml. toluene at room temperature for 1 hour. When left to stand thereafter, the mixture divided into a lower aqueous layer and an upper organic layer.

The AICAR concentration in the two layers was determined by ultraviolet absorption analysis, and the trialkyl phosphate content of each layer by determination of phosphorus.

The organic upper layer was found to contain 0.01 g. AICAR and 97.1 g. tributyl phosphate, whereas the aqueous lower layer contained 1.07 g. AICAR and only a trace of tributyl phosphate.

The afore-mentioned other nucleosides and purine or pyrimidine bases may similarly be discharged from their solutions in trialkyl phosphates into aqueous media by toluene or any of the other hydrocarbons or halogenated hydrocarbons referred to above.

Example VIII

Aqueous solutions containing Ip-GMP, GMP and IMP at concentrations of 33.0 g. per liter, 26.2 g. per liter, and 23.0 per liter, respectively, were prepared and adjusted to a pH of 1.0. 10 g. sodium chloride was added to 100 ml. of each solution. Examples of each solution were extracted with equal volumes of triethyl phosphate at room temperature for 60 minutes with agitation. The two phases in each mixture were permitted to separate. They were then analyzed for distribution of the solute in two layers.

The results are listed below.

| | Percentage extracted |
|---|---|
| Ip–GMP | 70.0 |
| GMP | 37.3 |
| IMP | 43.0 |

30 ml. solutions extracted with triethyl phosphate were vigorously stirred with 30 ml. benzene and 30 ml. water or 30 ml. 0.5 N aqueous ammonium hydroxide at room temperature for 1 hour. When left to stand thereafter, the mixture divided into two layers. The solute concentration in the two layers was determined by ultraviolet absorption analysis. The results were as follows:

| Solvent | Percentage extracted ||
|---|---|---|
| | Ip-GMP | IMP |
| Benzene plus water | 100.0 | 95.9 |
| Benzene plus 0.5 N aqueous ammonium hydroxide | 99.6 | 100 |

Example IX

An aqueous solution containing 0.25 g. S–AICAR per 50 ml. was adjusted to a pH of 2.0, and 5 g. sodium chloride was added to the solution. The solution was extracted with 50 ml. triethyl phosphate at room temperature for 30 minutes with vigorous agitation. When left to stand thereafter for a few hours, the two phases in the mixture were permitted to separate. They were then analyzed for distribution of S–AICAR in the aqueous layer by conventional methods. The percentage of S–AICAR extracted was 85%.

Example X

*Bacillus subtilis* ATCE 15115 capable of synthesizing AICAR was cultivated on a nutrient medium. The cultured broth was adjusted to a pH of 2.0 and concentrated.

1000 ml. concentrated broth containing 37.8 g. AICAR and 0.8 g. S–AICAR. 200 ml. triethyl phosphate and 20 g. sodium chloride were added to 200 ml. concentrated broth and the mixture were stirred at room temperature for 1 hour. They were permitted to separate into two layers by centrifuging, which were separated from each other. The amounts of AICAR and S–AICAR in the organic layer were analyzed. The results were as follows:

|  | Percentage extracted |
|---|---|
| AICAR | 70 |
| S–AICAR | 85 |

Example XI

A microorganism capable of synthesizing S–AICAR was cultivated on a nutrient medium. The cultured broth was adjusted to a pH of 2.0 and concentrated until the concentration of S–AICAR was 1.0 g. per liter.

100 ml. triethyl phosphate and 10 g. sodium chloride were added to 100 ml. solution, and the mixture was stirred vigorously at room temperature for 30 minutes. Two phases, an organic phase and an aqueous phase, were separated by centrifuging. This procedure was repeated twice more.

A triethyl phosphate solution containing S–AICAR was extracted with equal volumes of benzene and water with agitation. This procedure was repeated once more. Aqueous layers were collected and concentrated. 1.0 g. crude crystals (Purity: 90%) were obtained.

Percentage extracted of S–AICAR was 90%.

What is claimed is:

1. A method of extracting a substance selected from the group consisting of purine ribonucleotides, purine-bases, pyrimidine bases, and purine ribonucleosides from an aqueous solution thereof, which comprises contacting said solution with an organic liquid medium, said medium constituting a phase separate from said solution and including an effective amount of a tertiary phosphate of an alkanol having two to five carbon atoms.

2. The method set forth in claim 1, wherein said medium essentially consists of said phosphate and at least one solvent substantially insoluble in said aqueous medium, said substance being soluble in said solvent.

3. The method set forth in claim 1, wherein said substance is discharged from said liquid medium by admixing to said medium an organic solvent selected from the group consisting of hydrocarbons, said substance being substantially insoluble in said solvent, and said solvent being miscible with said medium, and halogenated hydrocarbons, and contacting the resulting mixture with an aqueous liquid.

4. The method set forth in claim 3, wherein said solvent is selected from the group consisting of benzene, toluene, dichloromethane, dichloroethane, and carbon tetrachloride.

5. The method as set forth in claim 1, wherein said substance is a member of the group consisting of the ribosides inosine, guanosine, adenosine, cytidine, uridine, thymidine, xanthosine, orotidine, 5-amino-4-imidazole carboxamide riboside and 5-amino-4-imidazole N-succino carboxamide riboside; the desoxyribose analogs of said ribosides; the 2′,3′-O-isopropylidene derivatives of said ribosides; the purine bases adenine, xanthine, hypoxanthine, methylxanthine and guanine; the pyrimidine bases uracil, methyluracil, thymine, cytosine, methylcytosine and isocytosine; the purine nucleatides 5′-inosinic acid, 5′-guanylic acid, 5′-adenylic acid and 5′-xanthylic acid; the desoxyribose analogs of said nucleotides; and the 2′,3′-O-alkylidene derivatives thereof.

6. The method set forth in claim 1, wherein said tertiary phosphate is triethyl phosphate or tributyl phosphate.

7. The method set forth in claim 1, wherein said aqueous solution contains a sufficient amount of neutral salt to make said tertiary phosphate substantially insoluble in said solution.

8. The method set forth in claim 7, wherein said neutral salt is sodium chloride, sodium sulfate, or ammonium chloride.

9. The method set forth in claim 1, wherein said aqueous solution and said liquid medium are approximately at room temperature, the substance to be extracted is a purine or pyrimidine base, or a nucleoside, and said aqueous solution has a pH between 3 and 12.

10. The method set forth in claim 1, wherein said aqueous solution has a pH below 5 and the substance to be extracted is a purine nucleotide.

References Cited

UNITED STATES PATENTS 2,415,826   2/1947   Laufer et al. _____ 260—211.5
2,606,899   8/1952   Smythe et al. _____ 260—211.5

LEWIS GOTTS, *Primary Examiner.*

J. BROWN, *Assistant Examiner.*